United States Patent Office 3,460,655
Patented Aug. 12, 1969

3,460,655
COMBINED SEAL AND WASHER FOR A
ROLLER CLUTCH
Roy Price Bowcott, Solihull, England, assignor to Joseph Lucas (Industries) Limited, Birmingham, England, a British company
Filed July 24, 1967, Ser. No. 655,497
Claims priority, application Great Britain, Aug. 19, 1966, 37,251/66
Int. Cl. F16d 11/06, 13/04
U.S. Cl. 192—45                                         1 Claim

ABSTRACT OF THE DISCLOSURE

This invention relates to a combined seal and washer, particularly for use in a starter assembly for internal combustion engines, comprising an annular resilient sealing member and a substantially similarly shaped annular washer in facial contact therewith, the washer being divided into at least two parts and the parts of the washer being bonded to the sealing member in such a way that the combined seal and washer can be threaded over a cylindrical shaft of greater diameter than the central hole in the sealing member and washer.

---

This invention relates to a combined seal and washer which is particularly designed for use in a starter assembly for internal combustion engines, but can also be used in other applications.

The present invention is directed to a starter assembly for an internal combustion engine, including a roller clutch having an outer member adapted to be driven by a starter motor, and an inner member formed integrally with a pinion adapted to engage a toothed wheel on the engine, a neck portion of lesser diameter than the pinion and inner member interconnecting the pinion and inner member, a washer extending within the neck portion and engaging the inner and outer members, a sealing member in contact with the washer, and a retaining sleeve holding the assembly in position, the washer and sealing member being formed as a unit in which the sealing member is resilient and annular, and the washer is similarly shaped and in facial contact with the sealing member, the washer being divided into at least two parts, with the parts of the washer being bonded to the sealing member, the diameter of the sealing member being less than the diameter of said pinion and said inner member, with the formation of said washer in at least two parts permitting the combined seal and washer to be threaded over the pinion or inner member into its correct position.

Figure 1:
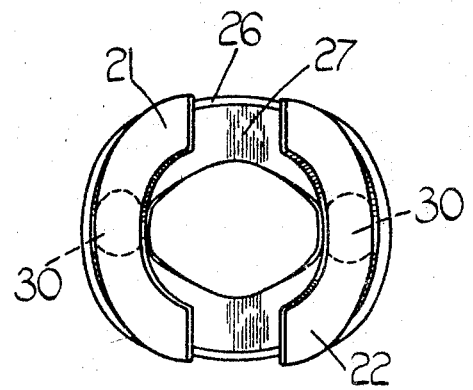
Figure 2:
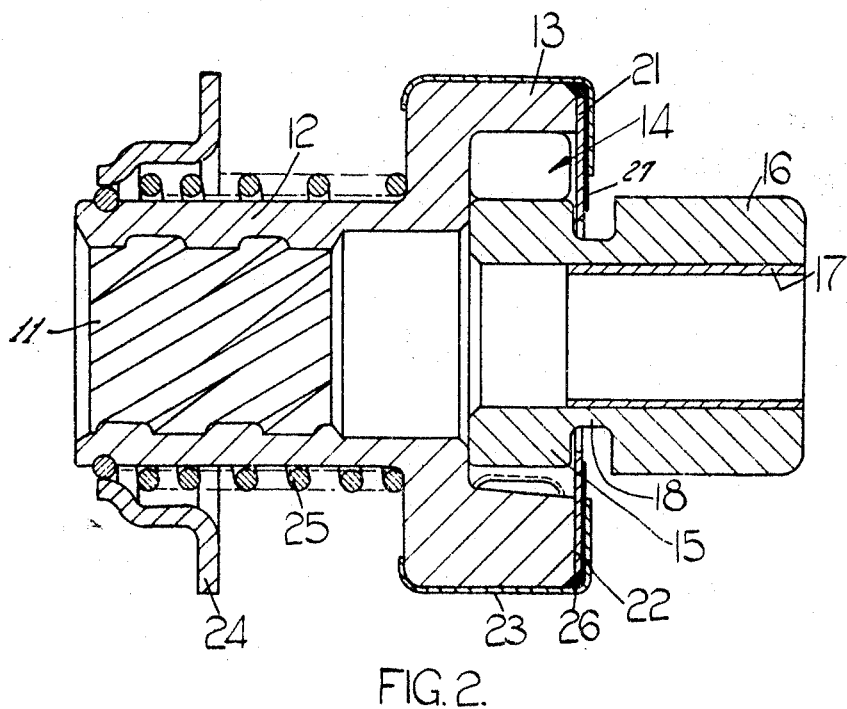

An example of the invention is illustrated in the accompanying drawings, in which:

FIGURE 1 is a perspective view of a combined seal and washer in a partly deformed condition; and FIGURE 2 is an axial sectional view of part of a starter assembly for internal combustion engines, using the seal and washer shown in FIGURE 1.

Referring first to FIGURE 2, the starter motor drives a shaft (not shown) which at its end is formed with a quick-pitch screw thread 11. Engaged with the thread 11 of the shaft is a sleeve 12 which at its end is of increased diameter and defines an outer member 13 of a roller clutch 14 of known construction. Inner member 15 of the roller clutch is integrally connected to a pinion 16 adapted to engage a toothed wheel on the engine to start the engine, a bearing sleeve 17 is provided on the internal surface of the pinion 16, and the pinion 16 is joined to the member 15 by a neck portion 18 of lesser diameter than the pinion. The inner member 15 is held in position axially by a pair of C-shaped washers 21, 22 together defining an annular washer, with the washers 21, 22 being in turn held in position by a retaining sleeve 23.

In order to start an engine, a solenoid is energized which moves a plate 24 to the right. Movement of the plate 24 moves the entire assembly shown to the right so that the pinion 16 is moved into engagement with the toothed wheel. The axial movement of the pinion is accompanied by angular movement by virtue of the quick pitch screw thread 11, and in the event that the pinion moves into tooth-to-tooth engagement with the toothed wheel, further movement of the plate 24 is taken up by a coil spring 25.

The arrangement thus far described is known, and it is also known to provide an O-ring 26 as a seal at the peripheral edge of the washers 21, 22. The disadvantage of this known arrangement is that during assembly, the retaining sleeve 23 is engaged with the outer member 13 from the right as viewed in the drawing, after which its left hand end is spun over to the position shown. It is therefore very easy for the O-ring 26 to become misaligned, and it is not possible to tell, once the assembly is completed, if the ring has become misaligned. In order to minimize the possibility of misalignment, the O-ring 26 is formed integrally at the edge of an annular ring 27 of substantially the same dimensions as the annular ring defined by the washers 21, 22. However, even with this arrangement a disadvantage arises, because it is possible for one of the two washers 21, 22 to ride over the other during assembly. In order to prevent this possibility, each of the washers is bonded to the annular ring 27 over part only of the surface of the washer as shown in FIGURE 1, where the bonded regions are indicated at 30. The effect of this arrangement is that although the internal diameter of the washers 21, 22 is smaller than the external diameter of the inner member 15, the combined seal and washer can be deformed in the manner shown in FIGURE 1, so that the flexibility of the ring 27 enables the assembly of washer and seal to be threaded over the inner member 15 or the pinion to the position shown.

Having thus described my invention what I claim as new and desire to secure by Letters Patent is:

1. A starter assembly for an internal combustion engine, comprising a roller clutch having an outer member adapted to be driven by a starter motor, and an inner member formed integrally with a pinion adapted to engage a toothed wheel on the engine, a neck portion, of smaller diameter than the pinion and the inner member, interconnecting the pinion and inner clutch member, a washer extending within said neck portion and engaging the inner and outer clutch members, a sealing member in contact with the washer, and a retaining sleeve holding the assembly in position, the washer and sealing member being formed as a unit in which the sealing member is resilient and annular, and the washer is similarly shaped and in facial contact with the sealing member, the washer being divided into at least two parts, and the parts of the washer being bonded to the sealing member, the diameter of said sealing member being less than the diameter of said pinion and said inner member, with the formation of said washer in at least two parts permitting the combined seal and washer to be threaded over the pinion or said inner member into its correct position.

References Cited

UNITED STATES PATENTS 2,370,912  3/1945  Pierce _____ 85—50 XR
3,223,213  12/1965  Bowcott _____ 192—45

CARLTON R. CROYLE, Primary Examiner

A. D. HERRMANN, Assistant Examiner

U.S. Cl. X.R.

74—6; 277—187